US009785231B1

(12) United States Patent
Zimmerman et al.

(10) Patent No.: US 9,785,231 B1
(45) Date of Patent: Oct. 10, 2017

(54) HEAD WORN DISPLAY INTEGRITY MONITOR SYSTEM AND METHODS

(71) Applicants: Kenneth A. Zimmerman, Sherwood, OR (US); Carlo L. Tiana, Portland, OR (US); Sarah Barber, Cedar Rapids, IA (US)

(72) Inventors: Kenneth A. Zimmerman, Sherwood, OR (US); Carlo L. Tiana, Portland, OR (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 319 days.

(21) Appl. No.: 14/038,597

(22) Filed: Sep. 26, 2013

(51) Int. Cl.
| | |
|---|---|
| *G09G 5/377* | (2006.01) |
| *G02B 27/01* | (2006.01) |
| *G06F 3/01* | (2006.01) |
| *G02B 27/00* | (2006.01) |
| *G06F 3/0346* | (2013.01) |
| *G06F 11/16* | (2006.01) |

(52) U.S. Cl.
CPC ......... *G06F 3/012* (2013.01); *G02B 27/0093* (2013.01); *G02B 27/01* (2013.01); *G02B 27/017* (2013.01); *G02B 2027/0187* (2013.01); *G02B 2027/0198* (2013.01); *G06F 3/0346* (2013.01); *G06F 11/1637* (2013.01)

(58) Field of Classification Search
CPC .......... G02B 2027/0187; G02B 27/017; G02B 27/01; G02B 27/0093; G02B 2027/0198; G06F 3/0346; G06F 11/1637; G06F 3/012
See application file for complete search history.

(56) References Cited

U.S. PATENT DOCUMENTS

| | | | | | |
|---|---|---|---|---|---|
| 3,371,159 | A | * | 2/1968 | Oncley | G01S 1/02 348/144 |
| 4,057,782 | A | * | 11/1977 | Muller | G01C 23/005 244/137.1 |
| 4,305,057 | A | * | 12/1981 | Rolston | G01C 23/005 340/974 |
| 4,348,186 | A | * | 9/1982 | Harvey | G09B 9/307 434/44 |
| 4,368,517 | A | * | 1/1983 | Lovering | G01C 23/005 340/972 |

(Continued)

OTHER PUBLICATIONS

Reid, J. Gary, Linear System Fundamentals, McGraw Hill 1st Ed. 1983, p. 82-83 and 442.*

*Primary Examiner* — Michael J Eurice
(74) *Attorney, Agent, or Firm* — Donna P. Suchy; Daniel M. Barbieri

(57) ABSTRACT

A head worn display system (e.g., helmet mounted (HMD) display system, and an eye wear mounted display system,) can include a combiner, a head position sensor and a computer. The computer provides symbology in response to first sensor input values associated with the head position. The symbology can be conformal with a real world scene. A monitoring system includes a redundant head position sensor for providing second sensor input values associated with head position. The computer monitors for positional accuracy of the symbology by comparing symbology calculated using the first and second input sensor values or by using an inverse function to compare sensor values.

20 Claims, 4 Drawing Sheets

(56) References Cited

U.S. PATENT DOCUMENTS

| | | | | |
|---|---|---|---|---|
| 4,421,486 A * | 12/1983 | Baldwin | F41G 3/225 | 352/132 |
| 4,439,755 A * | 3/1984 | LaRussa | F41G 3/225 | 340/980 |
| 4,479,784 A * | 10/1984 | Mallinson | G09B 9/307 | 434/43 |
| 4,634,384 A * | 1/1987 | Neves | G09B 9/302 | 348/123 |
| 4,647,967 A * | 3/1987 | Kirschner | G02B 27/0101 | 340/980 |
| 4,698,785 A * | 10/1987 | Desmond | G06F 11/1637 | 701/14 |
| 4,847,603 A * | 7/1989 | Blanchard | G02B 27/01 | 340/980 |
| 5,072,218 A * | 12/1991 | Spero | G02B 27/017 | 340/980 |
| 5,446,834 A * | 8/1995 | Deering | G02B 27/0093 | 345/419 |
| 5,566,073 A * | 10/1996 | Margolin | G01S 19/53 | 340/990 |
| 5,583,795 A * | 12/1996 | Smyth | A61B 3/0025 | 359/630 |
| 5,583,950 A * | 12/1996 | Prokoski | G06K 9/6203 | 382/212 |
| 5,645,077 A * | 7/1997 | Foxlin | A61B 5/1114 | 600/587 |
| 5,991,085 A * | 11/1999 | Rallison | G02B 27/017 | 345/8 |
| 6,028,536 A * | 2/2000 | Voulgaris | G01C 23/005 | 340/973 |
| 6,176,837 B1 * | 1/2001 | Foxlin | G01C 21/165 | 128/897 |
| 6,233,361 B1 * | 5/2001 | Downs | G01S 7/4802 | 348/E5.064 |
| 7,180,476 B1 * | 2/2007 | Guell | G01S 19/15 | 340/980 |
| 7,212,175 B1 * | 5/2007 | Magee | G02B 27/01 | 340/945 |
| 7,355,179 B1 * | 4/2008 | Wood | G06T 1/00 | 250/339.11 |
| 7,782,229 B1 * | 8/2010 | Barber | G01C 23/005 | 340/945 |
| 8,942,419 B1 * | 1/2015 | Wu | G01S 17/06 | 382/103 |
| 9,213,403 B1 * | 12/2015 | Raffle | G06F 3/011 | |
| 2002/0036750 A1 * | 3/2002 | Eberl | A61B 3/12 | 351/207 |
| 2002/0039073 A1 * | 4/2002 | Ben-Ari | F41G 3/225 | 340/980 |
| 2002/0126066 A1 * | 9/2002 | Yasukawa | G02B 27/017 | 345/8 |
| 2002/0158814 A1 * | 10/2002 | Bright | G02B 27/017 | 345/7 |
| 2003/0030597 A1 * | 2/2003 | Geist | G02B 27/0172 | 345/8 |
| 2004/0169617 A1 * | 9/2004 | Yelton | G06T 15/10 | 345/1.1 |
| 2005/0007261 A1 * | 1/2005 | Berson | G01C 23/00 | 340/945 |
| 2005/0046584 A1 * | 3/2005 | Breed | B60C 11/24 | 340/13.31 |
| 2005/0195277 A1 * | 9/2005 | Yamasaki | G02B 27/017 | 348/61 |
| 2005/0256675 A1 * | 11/2005 | Kurata | G02B 27/0093 | 702/153 |
| 2006/0028400 A1 * | 2/2006 | Lapstun | G02B 26/06 | 345/8 |
| 2006/0055628 A1 * | 3/2006 | Sanders-Reed | G01C 23/005 | 345/8 |
| 2006/0238877 A1 * | 10/2006 | Ashkenazi | G02B 27/0093 | 359/630 |
| 2006/0239525 A1 * | 10/2006 | Katayama | G06T 7/0044 | 382/128 |
| 2007/0046680 A1 * | 3/2007 | Hedrick | G01C 23/00 | 345/503 |
| 2007/0057781 A1 * | 3/2007 | Breed | B60K 35/00 | 340/457.1 |
| 2007/0086624 A1 * | 4/2007 | Breed | G06K 9/00362 | 382/104 |
| 2007/0241936 A1 * | 10/2007 | Arthur | G01C 23/00 | 340/958 |
| 2007/0297687 A1 * | 12/2007 | Yamasaki | G02B 27/017 | 382/255 |
| 2008/0045234 A1 * | 2/2008 | Reed | H04W 8/02 | 455/456.1 |
| 2008/0060034 A1 * | 3/2008 | Egnal | G01C 11/02 | 725/105 |
| 2008/0100612 A1 * | 5/2008 | Dastmalchi | G06F 19/321 | 345/418 |
| 2008/0186255 A1 * | 8/2008 | Cohen | G02B 27/017 | 345/8 |
| 2008/0297436 A1 * | 12/2008 | Oikawa | G02B 27/017 | 345/8 |
| 2009/0005961 A1 * | 1/2009 | Grabowski | G01C 21/365 | 701/532 |
| 2009/0189974 A1 * | 7/2009 | Deering | G09G 3/02 | 348/46 |
| 2009/0229160 A1 * | 9/2009 | Elliott | F41A 23/04 | 42/73 |
| 2009/0309812 A1 * | 12/2009 | Larson | G02B 27/017 | 345/8 |
| 2010/0149073 A1 * | 6/2010 | Chaum | G02B 27/0093 | 345/8 |
| 2010/0231705 A1 * | 9/2010 | Yahav | G02B 27/01 | 348/115 |
| 2010/0253539 A1 * | 10/2010 | Seder | G01S 13/723 | 340/903 |
| 2010/0253542 A1 * | 10/2010 | Seder | G01S 7/22 | 340/932.2 |
| 2010/0253598 A1 * | 10/2010 | Szczerba | G01S 13/723 | 345/7 |
| 2011/0075257 A1 * | 3/2011 | Hua | G02B 27/017 | 359/464 |
| 2011/0212717 A1 * | 9/2011 | Rhoads | G06F 17/30241 | 455/420 |
| 2011/0213664 A1 * | 9/2011 | Osterhout | G02B 27/017 | 705/14.58 |
| 2011/0270615 A1 * | 11/2011 | Jordan | H04N 21/4782 | 704/275 |
| 2011/0282130 A1 * | 11/2011 | Krueger | A61M 21/00 | 600/27 |
| 2012/0069131 A1 * | 3/2012 | Abelow | G06Q 10/067 | 348/14.01 |
| 2012/0075168 A1 * | 3/2012 | Osterhout | G02B 27/017 | 345/8 |
| 2012/0086725 A1 * | 4/2012 | Joseph | G06F 3/038 | 345/629 |
| 2012/0194418 A1 * | 8/2012 | Osterhout | G02B 27/0093 | 345/156 |
| 2012/0287040 A1 * | 11/2012 | Moore | G02B 27/01 | 345/157 |
| 2012/0302289 A1 * | 11/2012 | Kang | G06F 3/011 | 455/557 |
| 2013/0221195 A1 * | 8/2013 | Kennedy | H01L 27/14618 | 250/208.1 |
| 2013/0246967 A1 * | 9/2013 | Wheeler | G06F 3/012 | 715/784 |
| 2013/0283163 A1 * | 10/2013 | Mehringer | G06F 3/048 | 715/719 |
| 2013/0300766 A1 * | 11/2013 | Mukawa | G02B 27/0172 | 345/633 |
| 2014/0085452 A1 * | 3/2014 | Nistico | A61B 3/0008 | 348/78 |
| 2014/0178843 A1 * | 6/2014 | Smyth | G09B 19/00 | 434/238 |
| 2014/0191927 A1 * | 7/2014 | Cho | G02B 27/017 | 345/8 |

(56) References Cited

U.S. PATENT DOCUMENTS

| | | | | |
|---|---|---|---|---|
| 2014/0243614 A1* | 8/2014 | Rothberg | ............... | A61B 8/13 |
| | | | | 600/301 |
| 2014/0317575 A1* | 10/2014 | Ullmann | ............... | G06T 19/20 |
| | | | | 715/852 |
| 2014/0340286 A1* | 11/2014 | Machida | ........... | G02B 26/0833 |
| | | | | 345/8 |
| 2014/0340502 A1* | 11/2014 | Freeman | ................. | G06T 7/20 |
| | | | | 348/79 |
| 2014/0364209 A1* | 12/2014 | Perry | ..................... | G06F 3/013 |
| | | | | 463/31 |
| 2014/0369557 A1* | 12/2014 | Kayombya | ........ | G06K 9/00624 |
| | | | | 382/103 |
| 2015/0062161 A1* | 3/2015 | Kim | ..................... | G06T 19/006 |
| | | | | 345/633 |
| 2015/0212327 A1* | 7/2015 | Osterhout | ................ | G06F 5/10 |
| | | | | 359/630 |
| 2015/0301338 A1* | 10/2015 | Van Heugten | .......... | G02C 7/04 |
| | | | | 345/8 |
| 2016/0171772 A1* | 6/2016 | Ryznar | ................ | G02B 27/017 |
| | | | | 345/633 |

\* cited by examiner

HEAD WORN DISPLAY INTEGRITY MONITOR SYSTEM AND METHODS

BACKGROUND OF THE INVENTION

The present specification relates generally to the field of displays. More specifically, the specification relates to integrity monitoring for head worn displays.

A head worn display (HWD) can be positioned in front of a user's eyes to provide operational capabilities similar to a fixed installation head up display ("HUD"). Head worn displays (e.g., helmet mounted displays, eyewear mounted displays, etc.) can provide information that is viewable in virtual space for the operation of equipment, such as aircraft, ships, boats, naval crafts, medical equipment, robotic equipment, remote vehicles, unmanned vehicle systems ("UVS"), training simulators, entertainment systems, military equipment, land vehicles, etc. The information can include navigation parameters, guidance parameters, equipment parameters, location information, video information, remote views, symbology, etc.

Head worn displays can be used to overlay display symbology (e.g., one or more symbols) onto scenes viewable out of a window or other port. The symbols are intended to represent or enhance features in the view of the user and are projected to a combiner. For the symbology to remain conformal with the view through the combiner on a head worn display, the head worn display generally tracks the head position. A head tracker sensor assembly is generally integrated with the head worn display and includes sensors that provide head position measurements for aligning the conformal symbology presented on the combiner with the view of the pilot based on the orientation of the user's head. Generally, head tracker sensor assembly can measure the following values: x (lateral) position, y (vertical) position, z (horizontal) position, roll (left/right tilt) angle, pitch (up/down tilt) angle and yaw (rotation) angle.

In aircraft applications, head worn displays generally include a computer (e.g., a HUD computer) that utilizes the values from the head tracker sensor assembly to determine the pilot's head position relative to an aircraft frame of reference (e.g., the bore sight) and the orientation of the aircraft relative to the ground provided by an attitude and heading reference system ("AHRS") or inertial reference system (INS). Head position (e.g., x, y, z, roll, pitch, and yaw) measurement values are combined with associated parameters measured for the aircraft by the AHRS/IRS and transformed into earth (ground) frame. After this transformation to the ground frame, HWD symbology can be positioned on a combiner to overlay specific features of a real world scene as viewed through the combiner. For example, runway symbols can be displayed on the combiner that overlay the actual runway that the aircraft is approaching.

Assurance that information presented on a combiner correctly overlays the corresponding real world features is desirable prior to displaying that information to the user. For example, display functions can be monitored and redundant aircraft sensors can be utilized in fixed installation HUDs to ensure that symbols are properly positioned on the combiner. U.S. Pat. No. 4,698,785, incorporated herein by reference in its entirety, discloses a digital-based control data processing system for detecting during system operation the occurrence of data processing errors for HUDs. U.S. Pat. No. 7,212,175, incorporated herein by reference, also discloses a display presentation monitor for HUDs. An inverse algorithm can convert symbol position back to values of input parameters of aircraft orientation sensors which were used to position the symbol. The inverse values are compared to the actual input values associated with aircraft orientation sensors to determine if there is an unacceptable discrepancy. However, head tracking functions are currently not monitored for integrity in head worn display systems.

Thus, there is a need to determine head tracking errors in head worn displays. Further, there is a need to maintain a required level of integrity for aircraft applications in an head worn displays. Further still, there is a need for integrity monitoring of head worn displays that utilizes redundant head monitoring sensors. Further still, there is a need for a low cost integrity monitor and method for head worn displays. Yet further still, there is a need to determine symbology errors caused by head tracking sensors.

SUMMARY OF THE INVENTION

An exemplary embodiment relates to a monitoring system for use in a head worn display system. The head worn display system includes a combiner and a first head position sensor for providing first sensor input values. The head worn display system also includes a computer. The computer causes the combiner to provide symbology in response to the first sensor values associated with head position. The symbology is conformal with a real world scene. The monitoring system includes a redundant head position sensor for providing second sensor input values associated with the head position. The computer monitors positional accuracy of the symbology by comparing symbology calculated using first independent hardware components responding to the first input sensor values with symbology calculated using second independent hardware components responding to the second input sensor values.

Another exemplary embodiment relates to a method of monitoring integrity of symbology provided on a combiner. The symbology is conformal with a scene viewable through the combiner and is provided in response to first sensor input values. The symbology is conformal with the scene. The first sensor input values are associated with head position. The method includes calculating second sensor input values associated with the head position from data associated with the symbology using an inverse algorithm. The method also includes comparing the first sensor input values with the second sensor input values to determine if an integrity error exists.

Another exemplary embodiment relates to an error detection method for use in a head worn display system. The head worn display system provides symbology on a combiner in response to first sensor input values according to a first processing operation. The first sensor input values are associated with head position. The symbology is conformal with a scene viewable through the combiner. The method includes receiving second sensor input values associated with the head position. The second sensor values are from a source different than the first sensor input values. The method also includes receiving a symbol position associated with the symbology provided on the combiner, processing the symbol position in accordance with a second processing operation representing an inverse function of the first processing operation to provide calculated sensor values, and comparing the calculated sensor values to the first sensor values or to the second sensor values to determine a presence of an error.

BRIEF DESCRIPTION OF THE DRAWINGS

The exemplary embodiments will become more fully understood from the following detailed description, appended claims and the accompany drawings, which are briefly described below and wherein like numerals denote like elements:

DETAILED DESCRIPTION OF THE PREFERRED EMBODIMENTS

Figure 1:
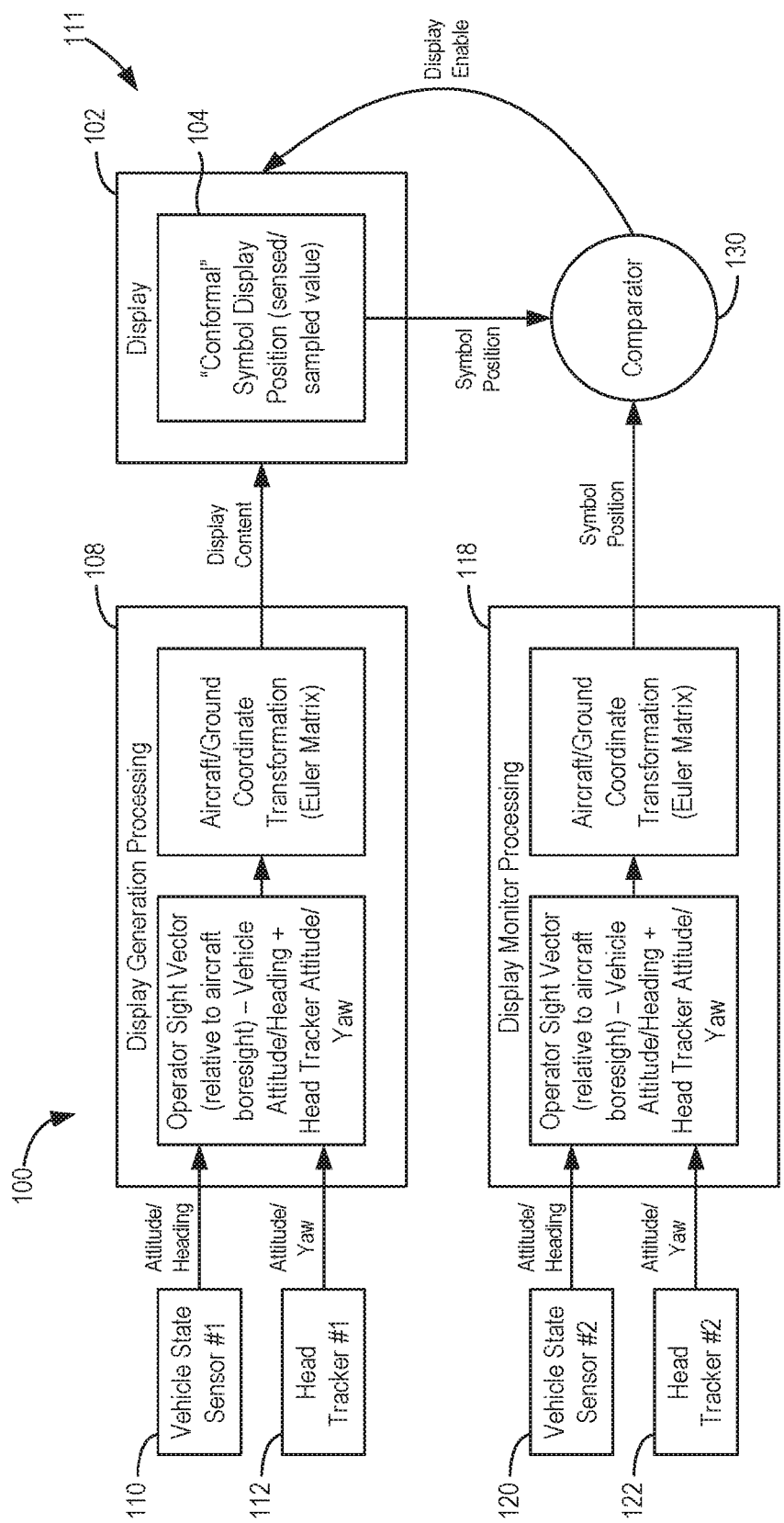
FIG. 1 is a schematic general block diagram of a head worn display system in accordance with an exemplary embodiment.

Before describing in detail the particular improved system and method, it should be observed that the invention includes, but is not limited to, a novel structural combination of components and not in the particular detailed configurations thereof. Accordingly, the structure, software, optics, methods, functions, control and arrangement of components have been illustrated in the drawings by readily understandable block representations and schematic drawings in order not to obscure the disclosure with structural details which will be readily available to those of ordinary skill in the art having the benefit of the description herein. Further, the invention is not limited to the particular embodiments depicted in the exemplary diagrams, but should be construed in accordance with the language of the claims.

Figure 4:
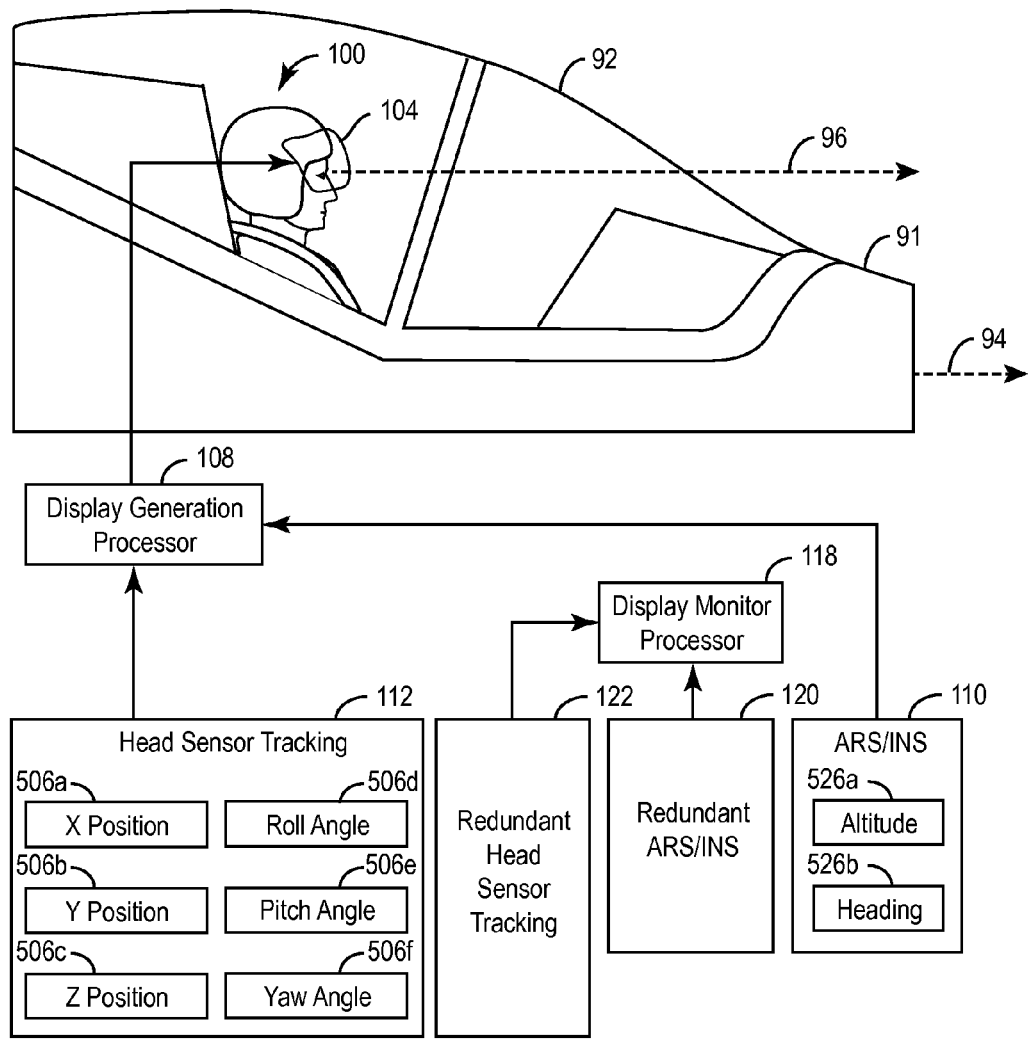
FIG. 4 is a schematic illustration of a head worn display in an aircraft in accordance with an exemplary embodiment.
Figure 5:
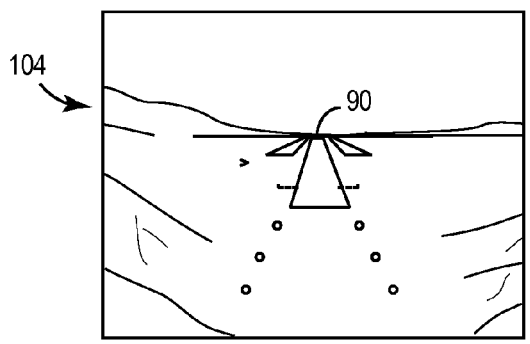
FIG. 5 is a schematic illustration of a view through the combiner illustrated in FIG. 4 in accordance with an exemplary embodiment.

With reference to FIGS. 1, 4 and 5, a head worn display system 100 provides conformal display symbology 90 associated with an environment 11. System 100 can be embodied as a helmet mounted display ("HMD") system, eyewear mounted display system or other worn display device. System 100 can be utilized in various applications including but not limited to aviation, medical, naval, targeting, ground-based vehicle, military, remote control, etc. In one embodiment, environment 11 can be a cockpit of an aircraft 91, bridge, operating room, etc. and include a window 92 or a port to an external environment. In an aircraft application, environment 11 can be an aircraft cockpit and the real world can be viewable through the windshield of a cockpit. The aircraft 91 has a boresight 94 and an operator has an operator line of sight 96.

Head worn display system 100 includes a display 102 including a combiner 104 for providing conformal symbology to a user. System 100 also includes a display generation processor or computer 108, a set of vehicle state sensors 110, and a set of head tracking sensors 112. System 100 also includes a display monitor processor or computer 118, a set of vehicle state sensors 120 and a set of head tracking sensors 122. Sensors 120 and 122 can be redundant sensors to sensors 110 and 112.

In one embodiment, head tracking sensors 120 and 122 can determine x, y and z positions 506a-c as well as pitch, tilt and rotation angles 506d-f associated with head position of a pilot. Vehicle state sensors 110 and 120 can provide sensor values associated with the vehicle attitude 526a and heading 526b in one embodiment. Computer 108 receives sensor values from sensors 110 and sensor values from sensors 112 and determines the operator's sight vector 96 relative to the aircraft bore sight 94. Display monitor computer 118 receives sensor values from sensors 120 and sensor values from sensors 122 and determines the operator's sight vector 96 relative to the aircraft bore sight 94. Computers 108 and 118 can utilize the same processing routine on independent hardware components in one embodiment. Although computers 108 and 118 are shown as separate computers in FIG. 1, computers 108 and 118 can be a single computer or be considered a single computer with separate processing elements.

Alternatively, a separate processing routine different than the processing routine used by computer 108 is used in computer 118. With such a system, an error in one of the algorithms utilized to process sensor signals from sensors 110, 120 or sensors 120 and 122 will not result in a common fault that may go unmonitored according to one embodiment. In one embodiment, computers 108 and 118 is a single computer with separate processors for each processing path. In another embodiment, computer 108 can be a processing path in a HUD computer, and computer 118 can be a processing path in a head tracking computer or head tracking electronics.

Computer 108 utilizes an aircraft/ground coded transformation matrix, such as, an Euler matrix, to provide display content (e.g., symbology) to display 102 according to one embodiment. The display content preferably includes symbology provided at locations for conformal representation on combiner 104. The display content can include enhanced vision images, synthetic vision images, text, pictograms, or other data useful when operating an aircraft according to various embodiments.

System 100 includes a comparator 130 which can be part of computers 108 and 118 or can be a separate computing or processing device. Comparator 130 receives the symbol position calculated by computer 118 and the symbol position provided to display 102 according to one embodiment. The symbol positions are compared to determine if they are within a tolerance according to one embodiment. If the symbol positions are not within a tolerance, comparator 130 can disable display 102 in one embodiment. Alternatively, a warning can be provided on display 102 if the symbol positions are not within a tolerance. The tolerance can be a fixed tolerance, a percentage, etc.

Comparator 130 can be a routine operating on one or both of computers 108 and 118. Alternatively, an independent computer/processor can operate a compare routine as comparator 130. In one embodiment, comparator 130 is a hardware or ASIC device.

Sensors 110 and 122 can be the same type sensors or can be sensors of different technology. According to one embodiment, sensors 112 can rely on inertial or other type sensing for head position while sensor 122 can utilize optical or other type of sensing. The types of sensors 112 and 122 are not disclosed in limiting any fashion. Sensors 112 and 122 can be inertial sensors manufactured by Intersense in one embodiment, magnetic sensors, or optical sensors in certain embodiments. In one embodiment, sensors 112 are part an optical system with sensors disposed on helmets for tracking markers in the cockpit, and sensors 122 are part of an optical system with sensors disposed in the cockpit for tracking markers on the helmet. Sensors 110 and 120 can be part of an attitude and heading reference system or an inertia navigation system in one embodiment. Alternatively, sensors 110 and 120 can include discrete yaw, pitch, and roll sensors.

Sensors 110 and 112 are used for display generation (e.g., symbology generation), and sensors 120 and 122 are used to monitor for errors in one embodiment. Computers 108 and 118 have independent hardware components to ensure the errors associated with hardware will be detected. In one embodiment, computers 108 and 118 include one or more processors and memories and can include the hardware associated with a HUD computer.

Figure 2:
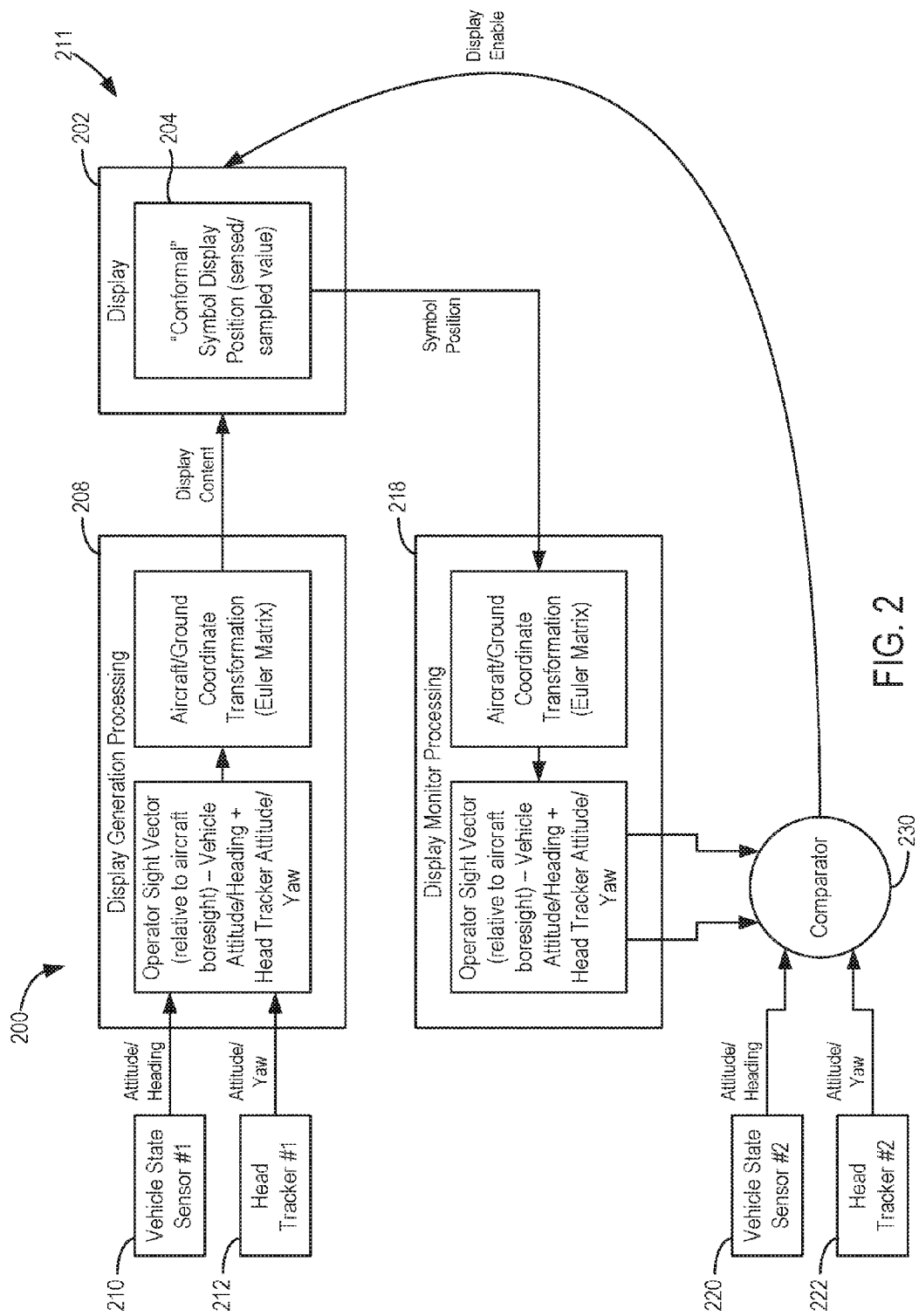
FIG. 2 is a schematic general block diagram of a head worn display system in accordance with another exemplary embodiment.

With reference to FIG. 2, a computing system such as a head worn display system 200 includes vehicle state sensors 210, head tracker sensors 212, vehicle state sensors 220, head tracker sensors 222, display generator processor or computer 208, display monitor processor or computer 218, display 202 and combiner 204 disposed in an environment 211. System 200 also includes a comparator 230. Sensors 210 and 212, computer 208 and display 202 operate similarly to sensors 110 and 112, computer 108 and display 102 discussed with reference to FIG. 1.

Computer 218 receives symbol positions associated with symbology provided on combiner 204 via computer 208 and uses a dissimilar processing operation to provide calculated sensor values to comparator 230. Comparator 230 also receives sensor values from sensors 222 and 230 and disables display 202 when the sensor values are out of a tolerance. Accordingly, system 200 compares calculated sensor values generated from symbols determined from sensor values from sensors 210 and 212 with sensor values from different sensors (e.g., sensors 220 and 222) in one embodiment. The algorithm can be an inverse algorithm for transforming the symbol position to sensor values. An inverse Euler matrix can be utilized in one embodiment. The use of the inverse algorithm allows errors associated with the software executed by computer 108 to be detected because identical software is not used in each of computer 108 and 118.

If the sensor values of sensors 210 and 212 and sensors 220 and 22 are not within a tolerance, comparator 230 can disable display 202 in one embodiment. Alternatively, a warning can be provided on display 202 if the sensor values are not within a tolerance. The tolerance can be a fixed tolerance, a percentage, etc.

Comparator 230 can be a routine operating on one or both of computers 208 and 218. Alternatively, an independent computer/processor can operate a compare routine as comparator 230. In one embodiment, comparator 230 is a hardware or ASIC device.

Figure 3:
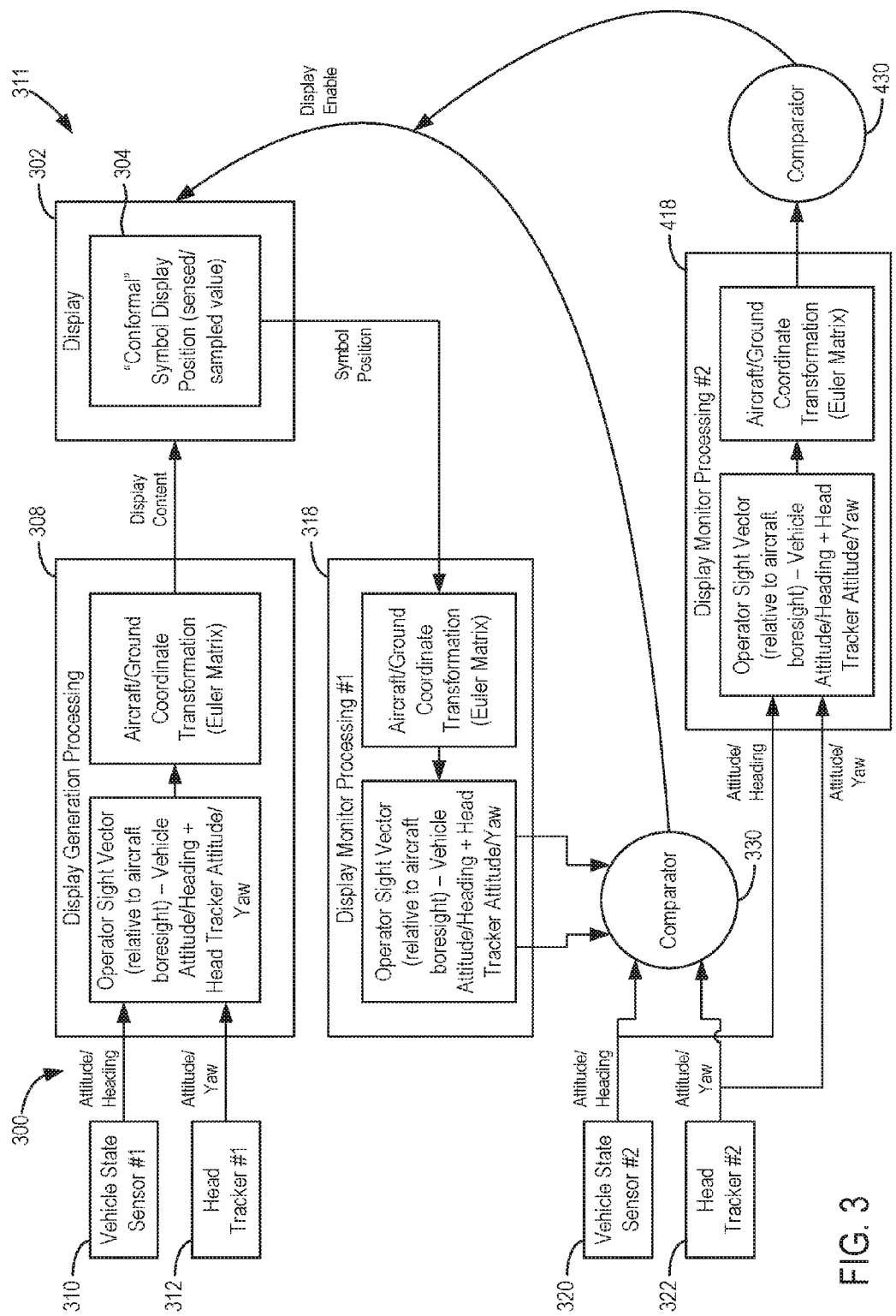
FIG. 3 is a schematic general block diagram of a head worn display system in accordance with yet another exemplary embodiment.

With reference to FIG. 3, a processing system such as head worn display system 300 includes a display generation processor or computer 308, a display 302, a combiner 304, vehicle state sensors 310 and head tracking sensors 312. Sensors 310, 312, computer 308, display 302 and combiner 304 can be similar to sensors 110 and 112, computer 108, display 102 and combiner 104 discussed with reference to FIG. 1.

System 300 also includes a display monitor processor or computer 318, vehicle state sensors 320, head tracking sensors 322, and a comparator 330. Computer 318, sensors 320 and 322, and comparator 330 can be similar to computer 218, sensors 220 and 222, and comparator 330 with reference to FIG. 2. In addition, system 300 can include a computer 418 coupled to sensors 320 and 322 and a comparator 430 according to one embodiment. Computer 418 and comparator 430 can provide a function similar to computer 118 and comparator 130 discussed above with reference to FIG. 1.

In one embodiment, system 300 can provide additional integrity by utilizing both an inverse algorithm monitoring approach and a symbol position comparison approach for symbol position monitoring. Symbol positions are compared via comparator 430, which receives a symbol position calculated from sensor values from sensor 320 and 322 using computer 308 and a symbol position calculated from sensor values 310 and 312 using computer 418 in one embodiment. Sensor values calculated by an inverse algorithm using computer 318 are compared to sensor values 320 and 322 in comparator 330 to determine if an error exists. The use of both types of monitoring systems provides additional integrity. If errors are not within a tolerance as determined by comparators 330 and 430, comparators 330 and 430 can disable display 302 in one embodiment. Alternatively, a warning can be provided on display 302 if the errors are not within a tolerance. The tolerance can be a fixed tolerance, a percentage, etc.

In one embodiment, sensors 322 can utilize different tracking technology from that used by sensor 112. Such a system can guard against head tracking technology sensitivities due to certain vehicle constraints such as flight deck configurations, electromagnetic interference, etc. Comparator 330 can advantageously compare the sensor values calculated by computer 318 to one or both of sensor values from sensors 322 and 320 or 310 and 312 in one embodiment.

While detailed drawings, specific examples of particular configurations given describe preferred and exemplary embodiments, they are for the purpose of illustration only. The invention disclosed is not limited to the specific form shown. For example, the methods may be formed in any variety of sequential steps or according to any variety of mathematical formulas. Hardware and software configurations shown and described may differ depending on chosen performance characteristics and physical characteristics of the communication devices. Software can be stored on a non-transitory medium for operation on hardware associated with computers such as HUD computers. The systems and methods depicted and described are not limited to the precise details and conditions disclosed. Specific data types and operations are shown in a non-limiting fashion. Furthermore, other substitutions, modifications, changes and omissions may be made in the design, operating conditions and arrangement of exemplary embodiments without departing from the scope of the invention is expressed in the independent claims.

What is claimed is:

1. In a head worn display system comprising a display, a first head position sensor for providing a plurality of first sensor input values and a computer, the display comprising a combiner, the computer comprising a display generation processor and a display monitor processor, the display generation processor causes a plurality of display symbology to be displayed on the combiner in response to the first sensor input values associated with head position, the display symbology being conformal with a real world scene and being located at a plurality of first symbology positions on the combiner, a monitoring system comprising:

the display monitor processor, wherein the display monitor processor is independent of the display generation processor, the display monitor processor calculating a plurality of second symbology positions associated with locations on the combiner calculated in response to a plurality of second sensor input values; and a redundant head position sensor for providing the second sensor input values associated with the head position, the redundant head position sensor being a separate device from the first head position sensor, wherein a comparator of the computer compares the first symbology positions of the display symbology calculated using first independent hardware components of the display generation processor responding to the first sensor input values with the second symbology positions associated with the locations on the combiner calculated using second independent hardware components of the display monitor processor responding to the second sensor input values to determine if the first symbology positions and the second symbology positions are within a tolerance, and the comparator disabling the display of the display if the first symbology positions and the second symbology positions are not within the tolerance.

2. The monitoring system of claim 1 wherein the redundant head position sensor uses different head tracking technology than the first head position sensor.

3. The monitoring system of claim 1 wherein the computer uses an inverse algorithm and compares a plurality of third sensor input values with the first sensor input values, the third sensor input values being calculated from data associated with the display symbology using the inverse algorithm.

4. The monitoring system of claim 1 wherein the computer uses an inverse algorithm and compares a plurality of third sensor input values with the second sensor input values, the third sensor input values being calculated from data associated with the display symbology using the inverse algorithm.

5. The monitoring system of claim 1 wherein the computer uses an inverse algorithm and compares a plurality of third sensor input values with the first sensor input values and the second input sensor values to determine whether the third sensor input values are within a tolerance of the second sensor input values and the first sensor input values, the third sensor input values being calculated from data associated with the symbology using the inverse algorithm.

6. The monitoring system of claim 1 wherein an inverse algorithm is performed on a plurality of third independent hardware components.

7. The monitoring system of claim 1 wherein the first sensor input values comprise head yaw, pitch, and roll values.

8. The monitoring system of claim 7 wherein the head yaw, pitch, and roll values are combined with aircraft yaw, pitch, and roll values provided by an INS or AHRS to cause the combiner to provide the display symbology conformal with the real world scene.

9. The monitoring system of claim 8 wherein the head yaw, pitch, and roll values and aircraft yaw, pitch, and roll values are combined using an Euler transformation matrix and referenced to a ground frame.

10. A method of monitoring a plurality of symbology provided on a combiner of a display, the symbology being conformal with a scene viewable through the combiner and being provided in response to a plurality of first sensor input values using a display generation processor, the first sensor input values being associated with head position and being provided from a first head tracker sensor, the method comprising:
calculating using a display monitor processor a plurality of second sensor input values associated with the head position from a plurality of first symbol position data associated with the symbology using an inverse algorithm, the display monitor processor being independent from the display generation processor;
calculating using the display monitor processor a plurality of second symbol position data using a plurality of third sensor input values associated with the head position from a second head tracker sensor;
comparing the first sensor input values with the second sensor input values and the second symbol position data and the first symbol position data to determine if an error exists; and
disabling the display in response to the error.

11. The method of claim 10 wherein the display is disabled by a comparator.

12. The method of claim 10 wherein the display monitor processor uses a different software routine than the display generation processor to calculate the second symbol position data using a plurality of second independent hardware components separate from a plurality of first independent hardware components associated with the display generation processor.

13. The method of claim 12 wherein the first sensor input values and the second sensor input values comprise a head yaw, pitch, and roll values.

14. The method of claim 13 wherein the second sensor input values are provided using the second head tracker sensor operating according to a different technology than the first head tracker sensor providing the first sensor input values.

15. The method of claim 14 wherein the head yaw, pitch, and roll values and aircraft yaw, pitch, and roll values are combined using an Euler transformation matrix and referenced to a ground frame to determine the symbology.

16. In a head worn display system for providing a plurality of symbology on a combiner of a display in response to a plurality of first sensor input values according to a first processing operation, the first sensor input values associated with head position, the symbology being conformal with a scene viewable through the combiner, an error detection method comprising:
receiving a plurality of second sensor input values associated with the head position, the second sensor input values being from a source different than the first sensor input values;
receiving a plurality of first symbol positions associated with the symbology provided on the combiner;
processing the first symbol positions in accordance with a second processing operation representing an inverse function of the first processing operation to provide calculated sensor values;
processing using the second sensor input values to determine a plurality of second symbol positions;
comparing the calculated sensor values to the first sensor input values or to the second sensor input values and comparing the first symbol positions and the second symbol positions to determine an error; and
disabling the display in response to the error.

17. The method of claim 16 wherein the first and second sensor input values comprise a head yaw, pitch, and roll values and wherein the calculated sensor values are compared to the first sensor input values and the second sensor input values.

18. The method of claim 16 wherein the source for the first sensor input values uses a different sensing technology than the source for the second sensor input values.

19. The method of claim 16 wherein
the second symbol positions are calculated from the second sensor input values using a third processing operation on hardware independent from hardware used for the first processing operation.

20. The method of claim 19 wherein the first and second sensor input values are used in the first and third processing operations, respectively.

\* \* \* \* \*